April 10, 1934.   C. G. SCHMITT   1,953,978
MOLDING MACHINE
Original Filed Feb. 29, 1928   3 Sheets-Sheet 1
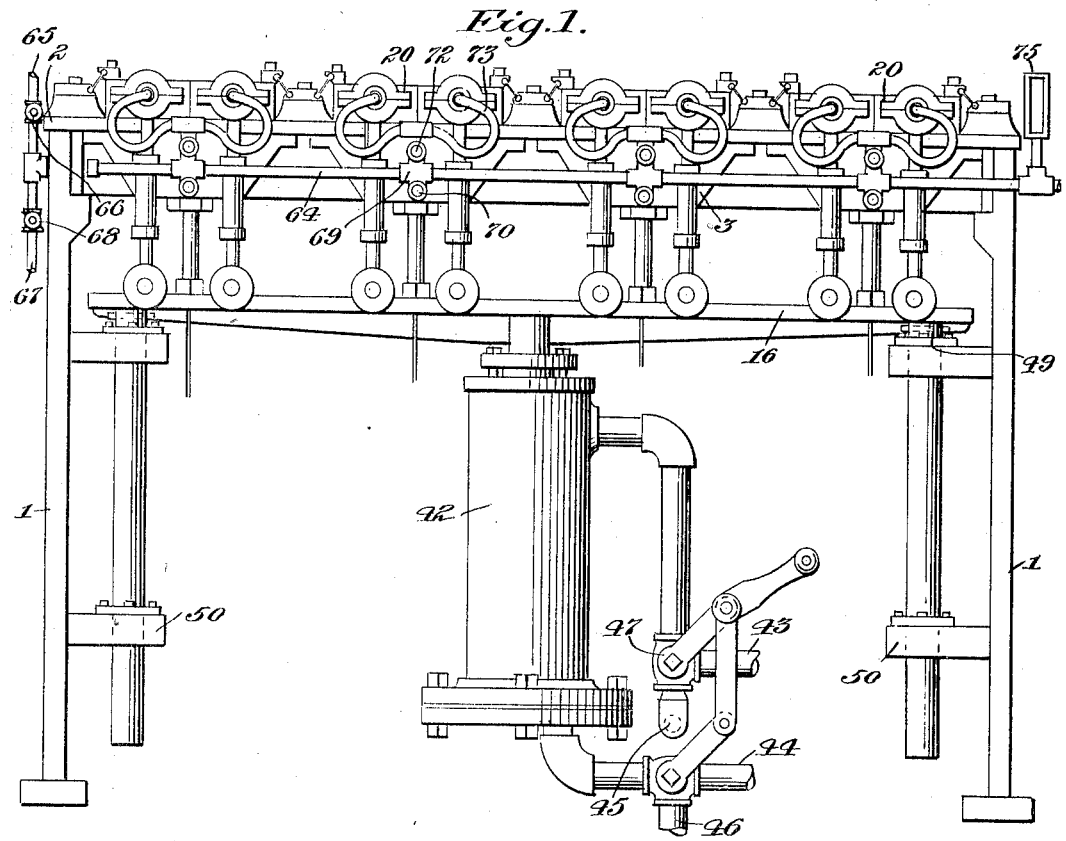

April 10, 1934.　　　C. G. SCHMITT　　　1,953,978
MOLDING MACHINE
Original Filed Feb. 29, 1928　　3 Sheets-Sheet 2
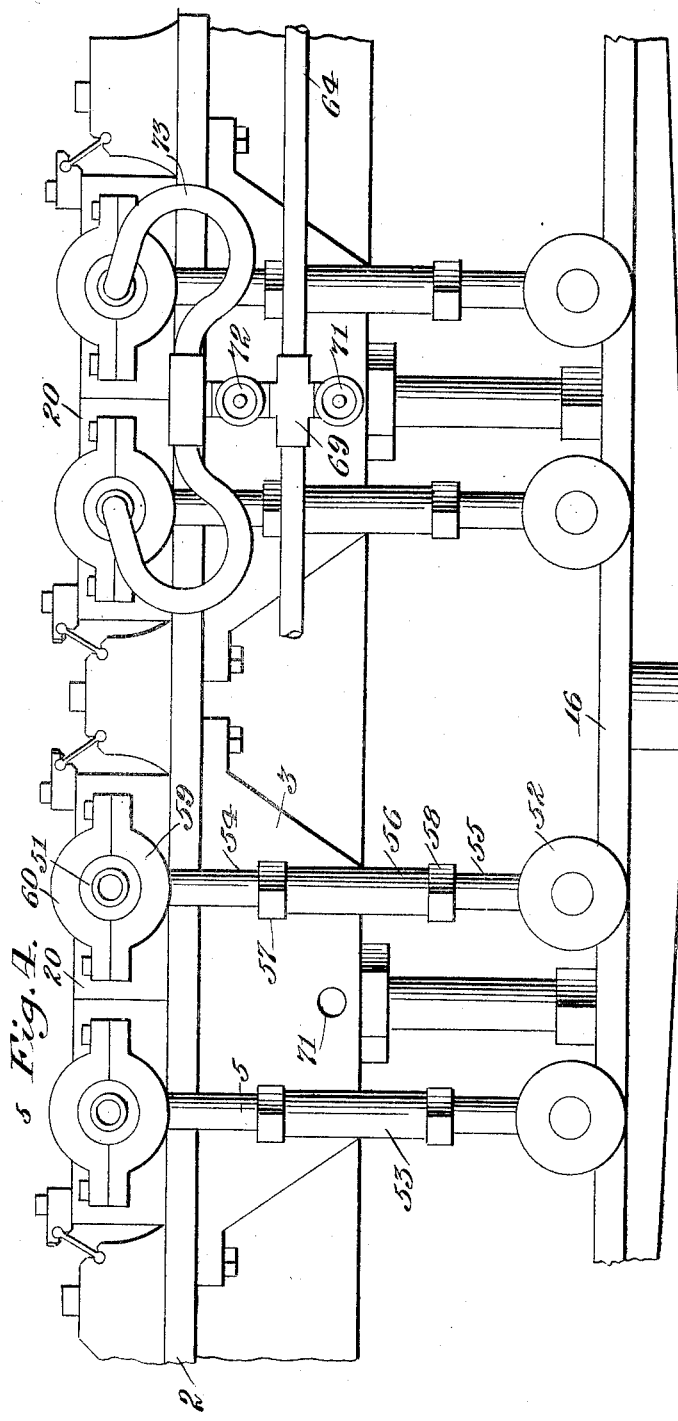
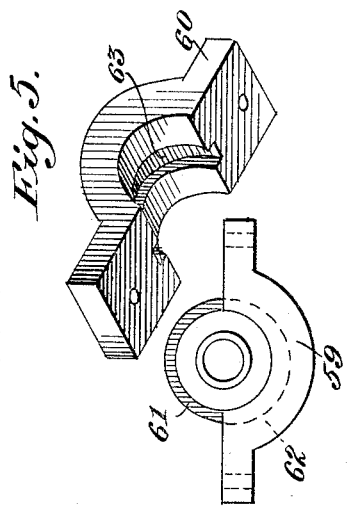
Inventor:
Charles G. Schmitt,
by Nathaniel Frucht
his Att'y.

April 10, 1934.  C. G. SCHMITT  1,953,978
MOLDING MACHINE
Original Filed Feb. 29, 1928    3 Sheets-Sheet 3
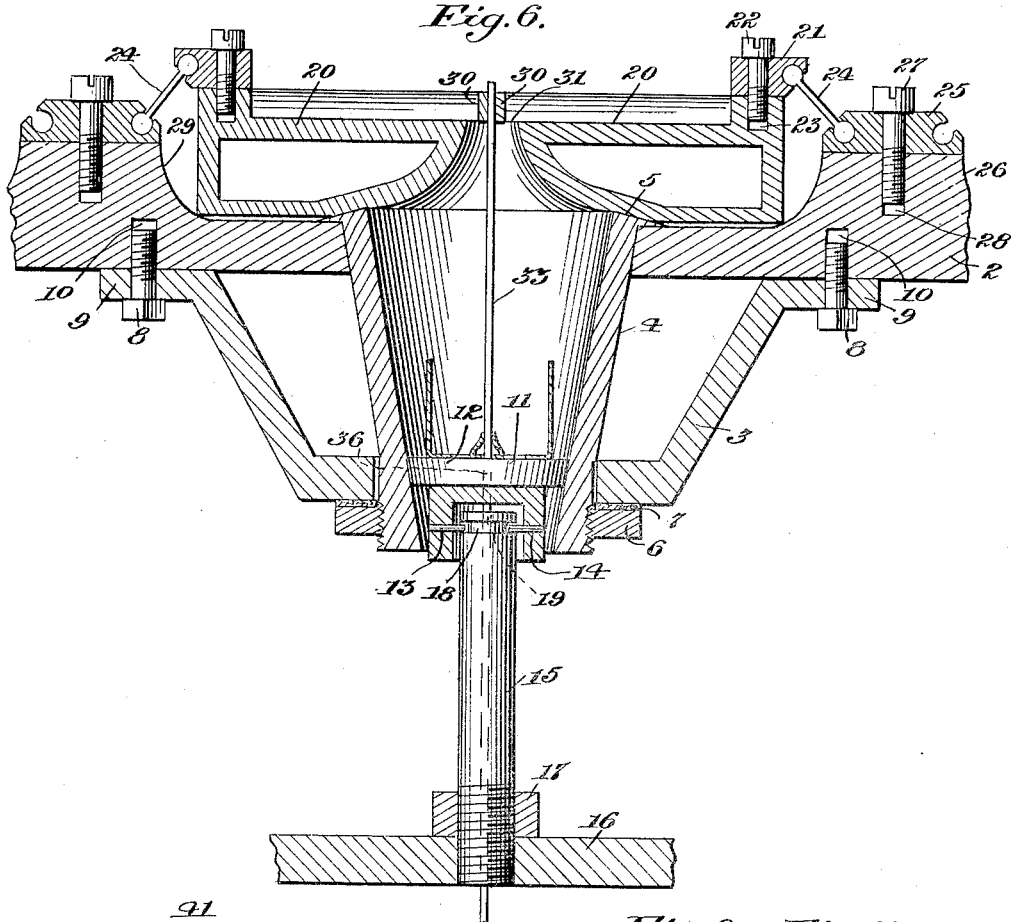
Fig.6.
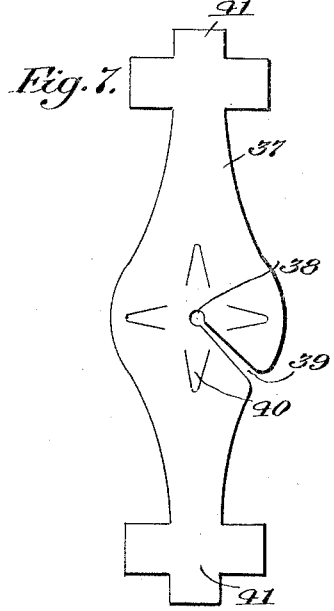
Fig.7.  Fig.8.
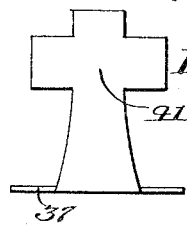
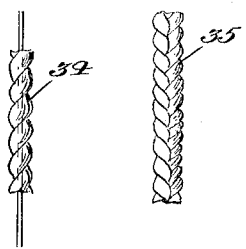
Fig.9.  Fig.10.
Inventor:
Charles G. Schmitt,
by Nathaniel Frucht
his Att'y.

Patented Apr. 10, 1934

1,953,978

UNITED STATES PATENT OFFICE 1,953,978

MOLDING MACHINE

Charles G. Schmitt, Phillipsburg, N. J.

Application February 29, 1928, Serial No. 258,028
Renewed June 24, 1932

17 Claims. (Cl. 18—27)

My present invention relates to molding machines for molding materials such as paraffin, wax, soap, candy, chemicals and other materials solid at atmospheric temperatures and having a low melting point, and particularly relates to machines for molding cup candles or night lights of wax or other suitable material.

Such candles are compact and fit within a cup glass, or similar holding receptacle. The present method of molding cup candles comprises molding each candle with its top upward, and forming an opening through each candle for the later insertion of a reinforced wick. The candles are removed from the molds by upwardly moving pistons, and loose, separate head or tip pieces are placed in the molds by hand, and must be removed by hand, since these separate pieces adhere to the candle tips when the candles are ejected from the molds.

One feature of my invention consists in eliminating the use of separate, individual head or tip pieces, and using instead end sections cooperating with a plurality of candle molds. These end sections are automatically removed from the path of the candles during ejectment, and are provided with heating and chilling controls independent of the usual heating and chilling controls for the mold bodies.

In place of the usual reinforced wicking, my invention contemplates using ordinary braided wicking material, composition wicking made of, for example, asbestos magnesium composition, paper, or any other material suitable for the purpose.

Although present cup candles are equipped with wick-holders, such wick-holders, first provided with manually inserted reinforced wicking, are attached to the molded candle by hand. My present invention facilitates quantity production of cup candles and the like, complete with wicking, in a single operation. My improved wick holder not only functions as a wick support and centering means, but prevents adhesion of the candle to the bottom of the mold, throws a pleasing shadow during the burning of the candle, and facilitates the removal of the candle remains from the glass or other container.

Features of my invention of great practical importance include the use of separate non-staining body molds, easily inserted and secured in position, and easily replaced. The casings receiving the body molds are sectional, to permit quick assembly and replacement, and to facilitate the construction of machines of any desired capacity. These sections receive the heating and the chilling mediums for the body molds, and are small in cross-sectional area to prevent wastage of the mediums.

My present invention also contemplates a body mold open at both ends, and a self-seating piston, having a small area of contact with the body mold, the lower edge of the piston expelling any excess material adhering to the sides of the mold through the open bottom. Both the piston and the piston rod are removable for assembly and for replacement, different sizes of rods and pistons permitting the manufacture of candles and the like of any desired height.

Other features of my invention are the provision of novel and effective means for removal, without binding, of the end sections out of the path of the ejected candles, and the use of easily controlled and effective hydraulic means for accomplishing the ejectment of the molded articles and the removal of the end sections.

The above and other features of my invention will be more readily understood from the following description in connection with the accompanying drawings, in which:

Fig. 1 is an end elevation of my improved molding machine, the end molds being in closed position.

Fig. 2 is a fragmentary plan view showing the wax receiving troughs and the upper wick positioning openings.

Fig. 3 is an enlarged section of Fig. 2 on the line 3—3, showing the grooved slope of the upper mold section for facilitating removal of surplus wax, and the lifting nipple through which the heating and chilling fluids enter.

Fig. 4 is an enlarged plan view of the details of the lifting mechanism and of the heating and chilling fluid supply lines.

Fig. 5 is a view, partly perspective, showing the retaining ridge on the lifting nipple and the corresponding grooves in the connecting rod members.

Fig. 6 is a sectional view of a single mold, the wick and wick plate being in position, prior to the pouring of the wax.

Figs. 7 and 8 are views of the wick plate as blanked out and as bent for use.

Figs. 9 and 10 are enlarged views of two forms of wicking, Fig. 9 showing the usual type of reinforced wicking, and Fig 10 wicking of the braided type.

Considering Figs. 1 and 2, my improved molding machine comprises a frame 1 carrying an upper plate 2 from which depend casings 3 within which the individual body molds 4 are secured, as shown in Fig. 6. Each individual mold 4 has a positioning shoulder 5, and is drawn tightly into position between the plate 2 and the bottom plate of casing 3 by means of a lock nut 6, the packing 7 rendering the juncture with the bottom plate fluid tight.

The casings 3 are detachably secured to the top plate 2 by studs 8 passing through flanges 9 and threaded into openings 10 in top plate 2. This construction permits quick assembly and replacement of a single unit, and the use of a single standard casing for any size molding machine.

The body mold 4 is made of material non-staining to candles, and preferably is steel with a chromium plating. I have found such molds very satisfactory, producing firm candles of uniform color. Within each mold is a piston 11 having a narrow seating surface 12 and a depending yoke 13 with two oppositely positioned protruding pins 14. A piston rod 15, detachably secured to the movable platen 16, and fixedly held by lock nut 17, has a groove 18 with two slots 19 through which the pins 14 are inserted, the loose fit of the pins 14 in the groove 18 permitting a universal movement of the piston 11 and thus causing the piston to be self-seating.

Above the body mold 4 and closely contacting with the upper part of the shoulder 5 are two end mold sections 20, hollow as shown, and adapted for pivotal movement with respect to the body molds 4. Each end section 20 has a hinge plate 21 secured thereto by studs 22 screwed into openings 23 in the tops of the end sections; a bar hinge 24 joins the hinge plate 21 with a double hinge plate 25 secured to a support 26 by means of studs 27 screwed into openings 28 of the support 26. The supports 26 have cam surfaces 29 for a purpose to be later described.

Each end section 20 has a side bar 30, and openings 31, see Fig. 2, for leading wax from the top portions of the end sections, which constitute wax receiving troughs, to the interior of the molds. The side bars 30 have semicircular openings 32 which form wick receiving and centering holes when the end sections 20 are in closed position.

The wick 33, which may be of the usual reinforced type 34, Fig. 9, of braided wicking 35, Fig. 10, or of any suitable material that will produce a controlled candle flame, is threaded through the hole formed by the openings 32, through an opening 36 in the self-seating piston rod 15, and passes down through the flooring supporting the machine to wicking reels below the flooring.

To properly position the wicking, and for other purposes hereinafter described, a wick plate 37, blanked as shown in Fig. 7, and having a wick receiving opening 38, a wick guiding slot 39, and wick retaining prongs 40, is used. The plate 37 has two ends 41 bent up as shown in Fig. 8, these ends casting a pleasing shadow during burning of the candle and serving as manual grips for releasing the wax at the bottom of a candle holder. In addition, as hereinafter explained, the plates 37 prevent sticking of the candle bottom to the piston 11.

Turning again to Fig. 1, the movable platen 16 is reciprocated by means of the hydraulic mechanism 42. This mechanism comprises a double acting piston, suitably packed, water entering the cylinder ends through inlet pipes 43, 44, and wasting through pipes 45, 46, the connected valves 47, 48, being manually operated to control the inlet to one end and the waste from the other end. Because the water must be forced out from one end, the hydraulic mechanism works smoothly and steadily with no jerks of any kind. The platen 16 is supported in its reciprocations by four cylinders 49 sliding in guides 50 secured to the frame 1.

The mechanism for lifting the end sections 20 is shown in Fig. 4, and comprises the lifting nipples 51, which have an eccentric motion with respect to the lifting mechanism, pins 52 secured in any desired manner to the platen 16, and adjustable lifting or connecting rods 53. The lifting rods 53 include two threaded rods 54, 55 joined by the intermediate cylinder 56, threaded at both ends, lock nuts 57, 58 maintaining the total length constant. A section 59, secured to the rod 54, is positioned to embrace the lower half of the lifting nipple 51, and a cap 60 embraces the upper half of the nipple 51 and is securely fastened to the section 59 by means of studs or the like. To ensure against displacement of the lifting rod, the nipple 51 has a positioning or retaining ridge 61 which fits into grooves 62, 63 on the section 59 and cap 60.

Turning again to Fig. 1, steam is admitted to conduit 64 through steam pipe 65, controlled by valve 66; cooling water is similarly admitted to conduit 64 through water pipe 67 controlled by valve 68. Four way connections 69 conduct the steam or the water to both the casings 3 and the end sections 20, valves 70 controlling the flow into the casings 3 through openings 71, (see Fig. 4) while valves 72 control the flow into two flexible connections 73 secured to end sections 74 of lifting nipples 51 (see Fig. 3). Both the casings 3 and the end sections 20 have drain connections on the opposite side of the machine, not shown, valve controlled, the casings and the end sections being inclined so that they drain by gravity, thus permitting the use of boiler cleaning compounds under pressure to clean the casings and end sections; a combination air relief valve and water gauge 75 permits visual inspection of the amount of chilling water in the machine.

The operation of my improved machine is as follows:

The molded candles having been ejected by upward movement of the pistons 11, wicks 33 have been pulled through the openings 36 and piston rods 15 against the tension of the wick rolls beneath the flooring. Plates 37 are now inserted, the wicks being pushed through guide slot 39 to central position. Valves 45, 46 are now turned, and the platen 16 slowly descends, drawing down the pistons 11 and the end sections 20, the wicking, which is frictionally held in opening 36, also moving down so that the parts assume the positions shown in Fig. 6. Instead of frictionally gripping the wicks 33 in opening 36, any friction device of well-known type may be inserted into piston rod 15 to accomplish the desired result.

As the sections 20 descend, the cam 29 ensures the abutting of the co-operating end sections. The piston 11, because of its self-seating design, forces any wax remaining in the mold 4 downwardly and out through the open end, thus preventing jamming of the piston by accumulations of wax.

Hot wax or other material is now poured into the trough tops of the end sections, and passes through openings 31 into each mold. Valve 67 being closed and valves 66, 70, 72 open, both body molds and end molds have been thoroughly heated, and the wax freely fills the molds. Valve 66 is now closed and valve 68 opened; the wax is quickly chilled, thus forming the finished candles in one operation. To prevent formation of pockets when making large cup candles, valves 68, 70 may be closed and valve 66 opened, to cause a further heating of the end molds and ensure solidness.

After the candle molds have been chilled, it may be desirable, in certain cases, to cause a final heating to gloss the candle surface, but this procedure is not necessary. The wick plates 37, resting on the piston 11, rapidly transmit the heat from the hot wax and prevent the candles from sticking to the pistons. Valves 47, 48 are now reversed, the pistons 11 move upwardly, ejecting the finished candles, and the end sections automatically move out of the path of the ejected candles, the lifting nipples 51 acting as eccentrics and turning so as to cooperate with the bar hinges 24 to shift the end sections laterally as they turn to prevent binding.

The completed cup candles are attractive in appearance, can be made to produce any desired flame and duration of burning by proper selection of the wicking material used, and throw attractive shadows while burning; the candle holders are easily cleaned by manually grasping the upstanding sections and turning, thus cutting the wax residue from the holder.

I claim as my invention:

1. A molding machine comprising parallel upper and lower plates and end plates forming a box-like chamber, body molds secured between the parallel plates, end mold sections hingedly secured to said upper plate, movable bottoms within the body molds, and means for moving the bottoms within the body molds to eject the molded articles and means for swinging the end mold sections out of the path of the ejected articles.

2. A molding machine comprising parallel upper and lower plates and end plates forming a box-like chamber, detachable body molds secured between the parallel plates, end mold sections hingedly secured to said upper plate, movable bottoms within the body molds, and means for moving the bottoms within the body molds to eject the molded articles and means for swinging the end mold sections out of the path of the ejected articles.

3. In a molding machine, a pivoted end mold section, means for turning said mold section and means for simultaneously laterally shifting said mold section during said turning operation to prevent binding.

4. In a molding machine, a mold section pivoted at one end, and mechanism for turning said mold section, said mechanism including an eccentric for simultaneously laterally shifting said mold section during said turning operation to prevent binding.

5. In a molding machine, a fixed element, a mold section, a bar hinge pivotally connecting said mold section to said fixed element, and mechanism to turn said mold section on said bar hinge, said mechanism including an eccentric for simultaneously laterally shifting said mold section during said turning operation to prevent binding.

6. In a candle molding machine, a body mold section, an end mold section, said end mold section having pivotal movement with relation to said body mold section, and means turning said end mold section comprising an eccentric, a rod for actuating said eccentric, a positioning ridge on said eccentric, and a cooperating groove on said rod.

7. A wick plate having wick centering means, wick holding means, and separate manual gripping sections adapted to facilitate removal of the candle remains from a candle holding receptacle.

8. A candle plate having wick centering means, prongs for holding the centered wick and separate manual gripping sections adapted to facilitate removal of the candle remains from a candle holding receptacle.

9. A candle plate for cup candles comprising central wick centering and holding means, and a shadow producing element laterally positioned with respect to said wick centering and holding means.

10. A method of molding candles complete with wick holder therein, comprising the steps of inserting wicking in a mold, inserting a wick holder in said mold in engagement with said wicking, and molding candle material about said wicking and said wick holder.

11. A method of preventing sticking of candles during molding thereof, comprising the steps of positioning a metallic insert in the mold in heat transmitting contact with the metal thereof, and molding said candle around the insert.

12. A candle molding machine comprising a candle mold, a movable bottom within the candle mold having a central wick receiving passage therethrough, movable end molds, means on said end molds cooperating with said wick receiving passage to centrally position wicking in said mold, means for moving the bottom upwardly to eject the molded candle, and means connected to the end molds for removing the end molds out of the path of the ejected candle.

13. In a molding machine, a plurality of body molds, a movable bottom within each body mold, end mold apparatus having a plurality of end mold recesses cooperating with the body molds, means for moving the bottoms within the body molds to eject molded articles therfrom, and means for moving the end mold apparatus in timed relation to the movement of the bottoms out of the paths of the articles during their ejection from the body molds.

14. In a molding machine, a plurality of body molds, a movable bottom within each body mold, end mold apparatus having a plurality of tapered end mold recesses cooperating with the body molds, means for moving the bottoms within the body molds to eject molded articles therefrom, and means for moving the end mold apparatus in timed relation to the movement of the bottoms, out of the paths of the articles during their ejection from the body molds.

15. In a molding machine, a plurality of body molds, a movable bottom within each body mold, end mold apparatus comprising hinged sections having a plurality of end mold recesses cooperating with the body molds, means for moving the bottoms within the body molds to eject molded articles therefrom, and means for moving the end mold apparatus in timed relation to the movement of the bottoms, out of the paths of the articles during their ejection from the body molds.

16. In a molding machine, a plurality of body molds, a movable bottom within each body mold, end mold apparatus comprising hinged sections which have cooperating recesses forming a plurality of end molds cooperating with the body molds, means for moving the bottoms within the body molds to eject molded articles therefrom, and means for moving the end mold apparatus in timed relation to the movement of the bottoms, out of the paths of the articles during their ejection from the body molds.

17. In a molding machine, a plurality of body molds, a movable bottom within each body mold, end mold apparatus comprising hinged sections which have cooperating recesses forming a plurality of tapered end molds cooperating with the body molds, means for moving the bottoms within the body molds to eject molded articles therefrom, and means for moving the end mold apparatus in timed relation to the movement of the bottoms, out of the paths of the articles during their ejection from the body molds.

CHARLES G. SCHMITT.